US006741742B1

(12) United States Patent
Hagiwara

(10) Patent No.: US 6,741,742 B1
(45) Date of Patent: May 25, 2004

(54) ENTERTAINMENT SYSTEM, ENTERTAINMENT APPARATUS, RECORDING MEDIUM, AND PROGRAM

(75) Inventor: Kaoru Hagiwara, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 585 days.

(21) Appl. No.: 09/691,022

(22) Filed: Oct. 19, 2000

(30) Foreign Application Priority Data

Oct. 22, 1999 (JP) .......................................... 11-301657
Oct. 5, 2000 (JP) ....................................... 2000-306728

(51) Int. Cl.[7] .............................................. G06K 9/62
(52) U.S. Cl. ...................................... 382/209; 382/218
(58) Field of Search ............................... 382/100, 181, 382/209, 218, 311; 345/700, 706; 463/36, 37, 43

(56) References Cited

U.S. PATENT DOCUMENTS

| | | | | | |
|---|---|---|---|---|---|
| 4,464,118 | A | * | 8/1984 | Scott et al. | 434/85 |
| 5,326,104 | A | * | 7/1994 | Pease et al. | 463/18 |
| 5,649,861 | A | * | 7/1997 | Okano et al. | 463/30 |
| 5,675,390 | A | * | 10/1997 | Schindler et al. | 345/717 |
| 5,759,100 | A | * | 6/1998 | Nakanishi | 463/37 |
| 5,769,719 | A | * | 6/1998 | Hsu | 463/37 |
| 5,851,148 | A | * | 12/1998 | Brune et al. | 463/25 |
| 5,876,286 | A | * | 3/1999 | Lee | 463/31 |
| 6,001,017 | A | * | 12/1999 | Okano et al. | 463/43 |
| 6,529,875 | B1 | | 3/2003 | Nakajima et al. | 704/275 |
| 6,556,219 | B1 | * | 4/2003 | Wugofski | 345/762 |
| 6,582,309 | B2 | * | 6/2003 | Higurashi et al. | 463/31 |

FOREIGN PATENT DOCUMENTS

| | | |
|---|---|---|
| EP | 0 982 055 A1 | 3/2000 |
| GB | 2 334 809 | 9/1999 |
| JP | 9-26748 | 1/1997 |
| JP | 10-63174 | 3/1998 |
| JP | 10-161673 | 6/1998 |
| WO | WO 98 02223 | 1/1998 |
| WO | WO 98 32107 | 7/1998 |
| WO | WO99/32200 | 7/1999 |

OTHER PUBLICATIONS

Note: English language abstracts of the above Japanese citations are provided to serve as partial translations thereof.

* cited by examiner

Primary Examiner—Daniel Mariam
(74) Attorney, Agent, or Firm—Paul A. Guss

(57) ABSTRACT

An entertainment system has an input determiner for comparing an input pattern image displayed on the screen of the display monitor according to a control input entered from a manual controller and a reference pattern image with each other, and producing an evaluation of the control input based on the level of similarity between the input pattern image and the reference pattern image. The input determiner has an image converter for converting the control input from the manual controller into the input pattern image, a similarity calculator for comparing the input pattern image and the reference pattern image with each other, and determining the level of similarity therebetween, an evaluation calculator for producing the evaluation of the control input based on the determined level of similarity, and an animation processor for displaying an animation based on the present evaluation on the screen of the display monitor.

16 Claims, 26 Drawing Sheets

FIG. 21

SCENARIO VIEW INFORMATION TABLE (250)

| | |
|---|---|
| 0TH RECORD | LEADING STORAGE ADDRESS |
| 1ST RECORD | LEADING STORAGE ADDRESS |
| 2ND RECORD | LEADING STORAGE ADDRESS |
| ⋮ | ⋮ |

FIG. 24

ANIMATION INFORMATION TABLE (256)

| | |
|---|---|
| 0TH RECORD | LEADING STORAGE ADDRESS |
| 1ST RECORD | LEADING STORAGE ADDRESS |
| 2ND RECORD | LEADING STORAGE ADDRESS |
| ⋮ | ⋮ |

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system for displaying an input pattern image according to a command or control input from a manual controller and evaluating a control input based on the level of similarity of the input pattern image to a reference pattern image, an entertainment apparatus for executing various programs, a recording medium storing a program and data that are capable of evaluating the control input, and a program itself.

2. Description of the Related Art

Some entertainment systems including entertainment apparatus such as video game machines display video game images based on video game data stored in a recording medium such as a CD-ROM or the like on the display screen of a television receiver while allowing the user or game player to play the video game with commands entered via a manual controller.

In those entertainment systems, the entertainment apparatus and the manual controller are usually connected to each other by a serial interface. When a clock signal is supplied from the entertainment apparatus to the manual controller, the manual controller sends key switch information based on the user's control entries in synchronism with the clock signal.

Recently developed manual controllers incorporate a vibration generating means for applying vibrations to the user based on a request from an external apparatus such as an entertainment apparatus, for example. While a video game is in progress, the vibration generating means applies various different kinds of vibrations to the user in response to user's different control entries.

Video games which are applied to the evaluation of control inputs entered from the user are available in the market. In these video games, symbol marks representing direction buttons and various selection buttons are randomly displayed in succession on the display unit. The user quickly presses control buttons on the manual controller in order to match the successively displayed symbol marks. The video game machine calculates a match between the symbol marks and the pressed control buttons thereby to evaluate the control inputs that have been entered when the control buttons are pressed.

Stated otherwise, these video games judge whether a control button pressed by the user has matched the displayed symbol mark or not. Based on the evaluation or judged result, the progress of the video game is determined, i.e., a gameover is declared or the video game proceeds to a next stage.

If control inputs are judged based not only on whether they match symbol marks or not, but also on some other evaluations than the agreement and disagreement between the control inputs and the symbol marks, i.e., evaluations other than whether the control inputs and the symbol marks match each other or not, then it will be possible to provide the video game with more detailed settings for its progress.

SUMMARY OF THE INVENTION

It is therefore an object of the present invention to provide an entertainment system, an entertainment apparatus, a recording medium, and a program which are capable of evaluating a control input entered by the user in an analog fashion, rather than on a digital evaluation based on the agreement and disagreement between the control input and a reference signal, for thereby providing a video game with detailed settings for its progress.

An entertainment system according to the present invention includes an entertainment apparatus for executing various programs, at least one manual controller for entering control requests from the user into the entertainment apparatus, a display unit for displaying images outputted from the entertainment apparatus, and input determining means for comparing an input pattern image displayed according to a control input entered from the manual controller and a reference pattern image with each other, and producing an evaluation of the control input based on the level of similarity between the input pattern image and the reference pattern image.

According to the present invention, there is provided an entertainment apparatus for connection to at least a manual controller for outputting a control request from the user and a display unit for displaying images, comprising input determining means for comparing an input pattern image displayed according to a control input entered from the manual controller and a reference pattern image with each other, and producing an evaluation of the control input based on the level of similarity between the input pattern image and the reference pattern image.

According to the present invention, there is also provided a recording medium storing a program and data for use in an entertainment system having an entertainment apparatus for executing various programs, at least one manual controller for entering control requests from the user into the entertainment apparatus, and a display unit for displaying images outputted from the entertainment apparatus, the program comprising the steps of comparing an input pattern image displayed according to a control input entered from the manual controller and a reference pattern image with each other, and producing an evaluation of the control input based on the level of similarity between the input pattern image and the reference pattern image.

According to the present invention, there is further provided a program readable and executable by a computer, for use in an entertainment system having an entertainment apparatus for executing various programs, at least one manual controller for entering control requests from the user into the entertainment apparatus, and a display unit for displaying images outputted from the entertainment apparatus, the program comprising the steps of comparing an input pattern image displayed according to a control input entered from the manual controller and a reference pattern image with each other, and producing an evaluation of the control input based on the level of similarity between the input pattern image and the reference pattern image.

Therefore, an input pattern image displayed according to a control input entered from the manual controller and a reference pattern image may be compared with each other, and an evaluation of the control input may be produced based on the level of similarity between the input pattern image and the reference pattern image. Consequently, the control input may be evaluated in an analog fashion, rather than on a digital evaluation based on the agreement and disagreement between the input pattern image and the reference pattern image, for thereby providing the game with detailed settings for its progress.

The input determining means or steps may comprise image converting means for, or the step of, converting the control input from the manual controller into the input pattern image, similarity calculating means for, or the step of, comparing the input pattern image and the reference pattern image with each other, and determining the level of similarity therebetween, and evaluation calculating means for, or the step of, producing the evaluation of the control input based on the determined level of similarity.

The manual controller may have an analog input block, and the image converging means or step may comprise means for, or the step of, generating the input pattern image based on data from the analog input block.

The entertainment system, the entertainment apparatus, the recording medium, or the program may further comprise progress changing means for, or the step of, changing the progress of a program executed by the entertainment apparatus based on the evaluation produced by the evaluation calculating means or step.

The progress of the program may comprise the execution of a scenario, and the progress changing means or step may comprise means for, or the step of, changing the scenario based on the evaluation produced by the evaluation calculating means or step.

The input determining means or step may include animation processing means for, or the step of, displaying an animation depending on the evaluation produced by the evaluation calculating means or step.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 21 is a diagram showing details of a scenario view information table;

FIG. 24 is a diagram showing details of an animation information table; and

DESCRIPTION OF THE PREFERRED EMBODIMENT

An entertainment system and an entertainment apparatus according to the present invention as applied to a video game apparatus, and a recording medium and a program according to the present invention as applied to a recording medium which stores a program and data to be executed by the video game apparatus and a program to be executed by the video game apparatus will be described below with reference to FIGS. 1 through 26.

Figure 1:
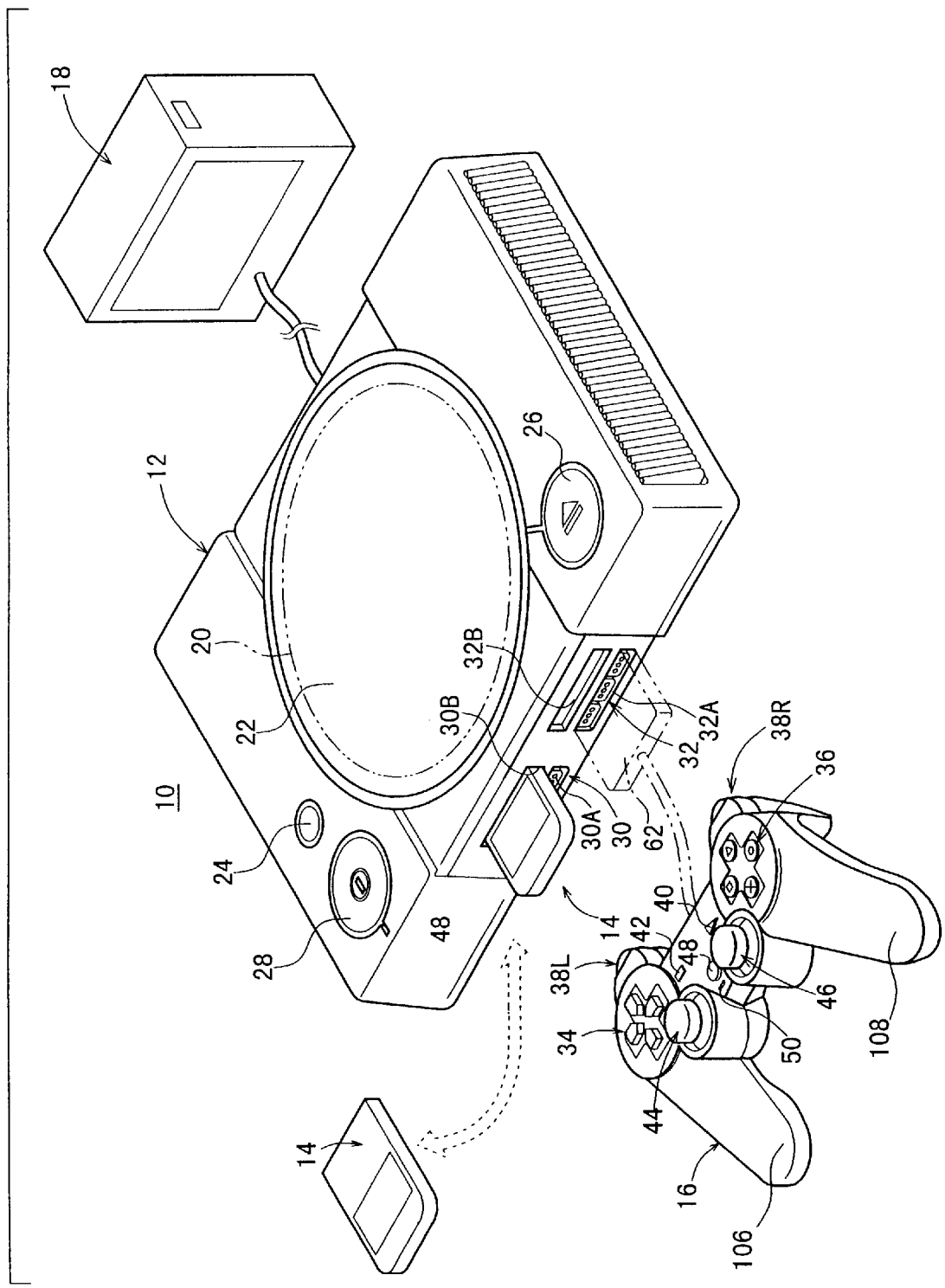
FIG. 1 is a perspective view of an entertainment system according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 which stores an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 or portable information terminals (not shown) having the function of the memory card 14 for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
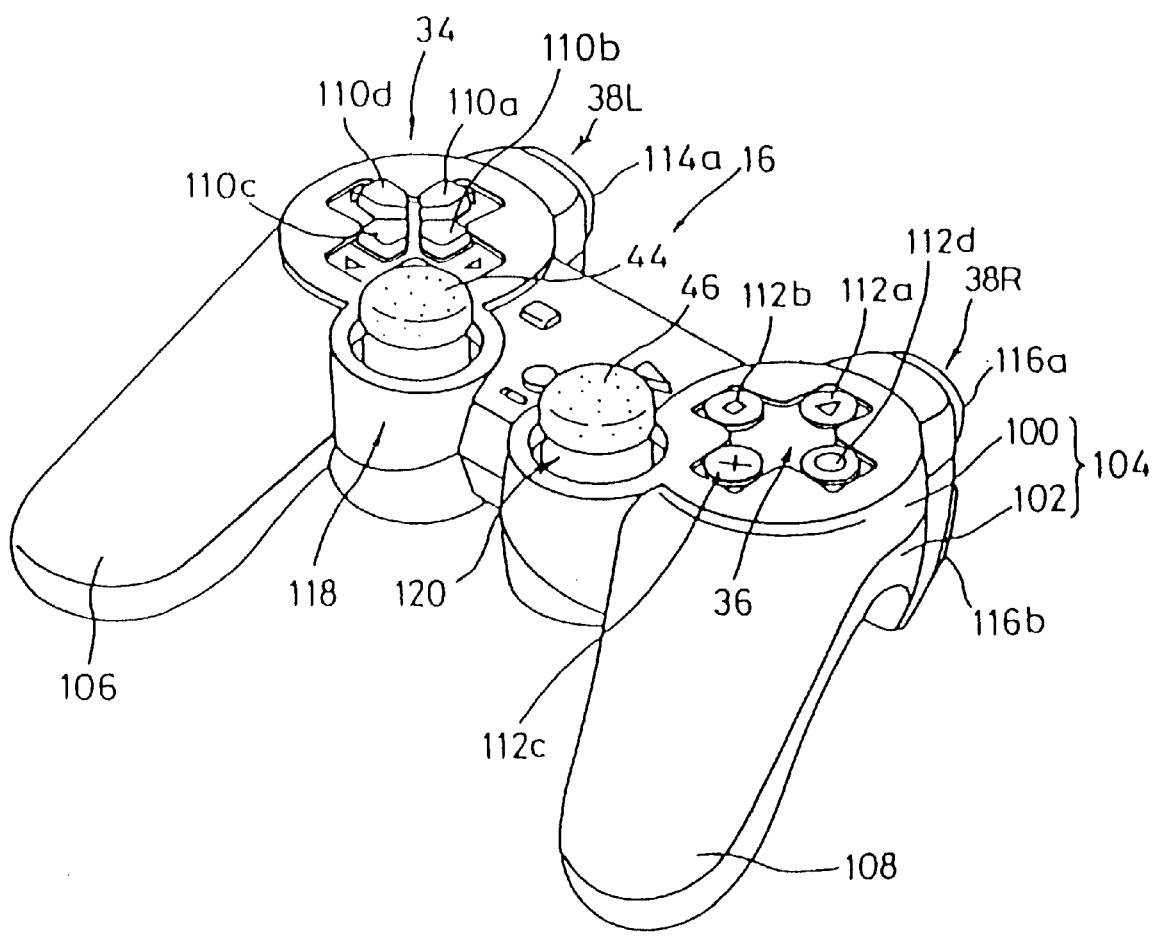
FIG. 2 is a perspective view of a manual controller.
Figure 3:
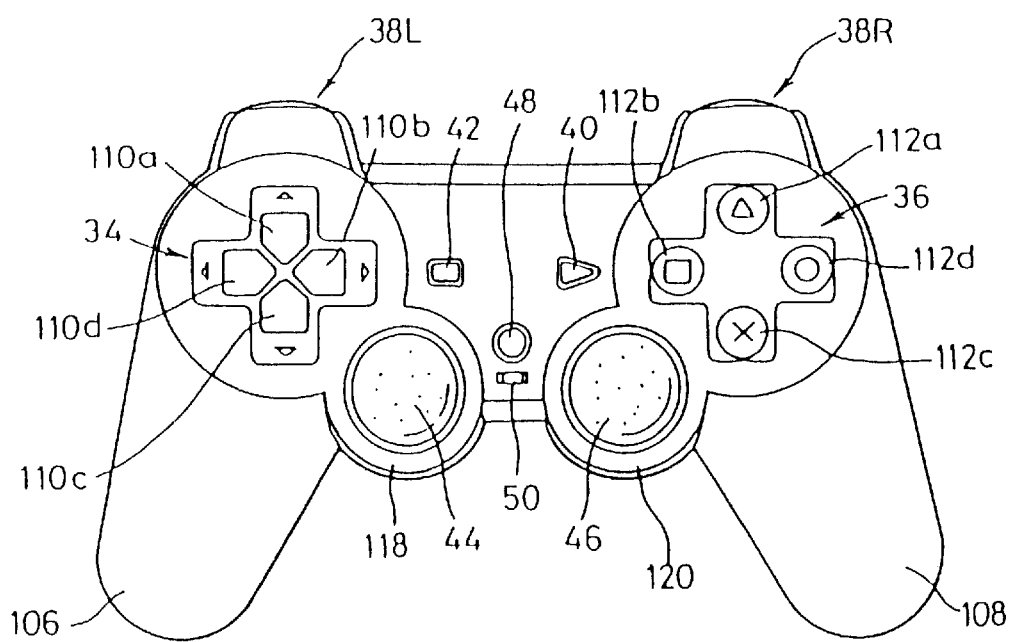
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and a mode indicator 50 for indicating a selected control mode. The mode indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 10c, and a fourth pressable control member (left button) 10d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110b, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (X button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
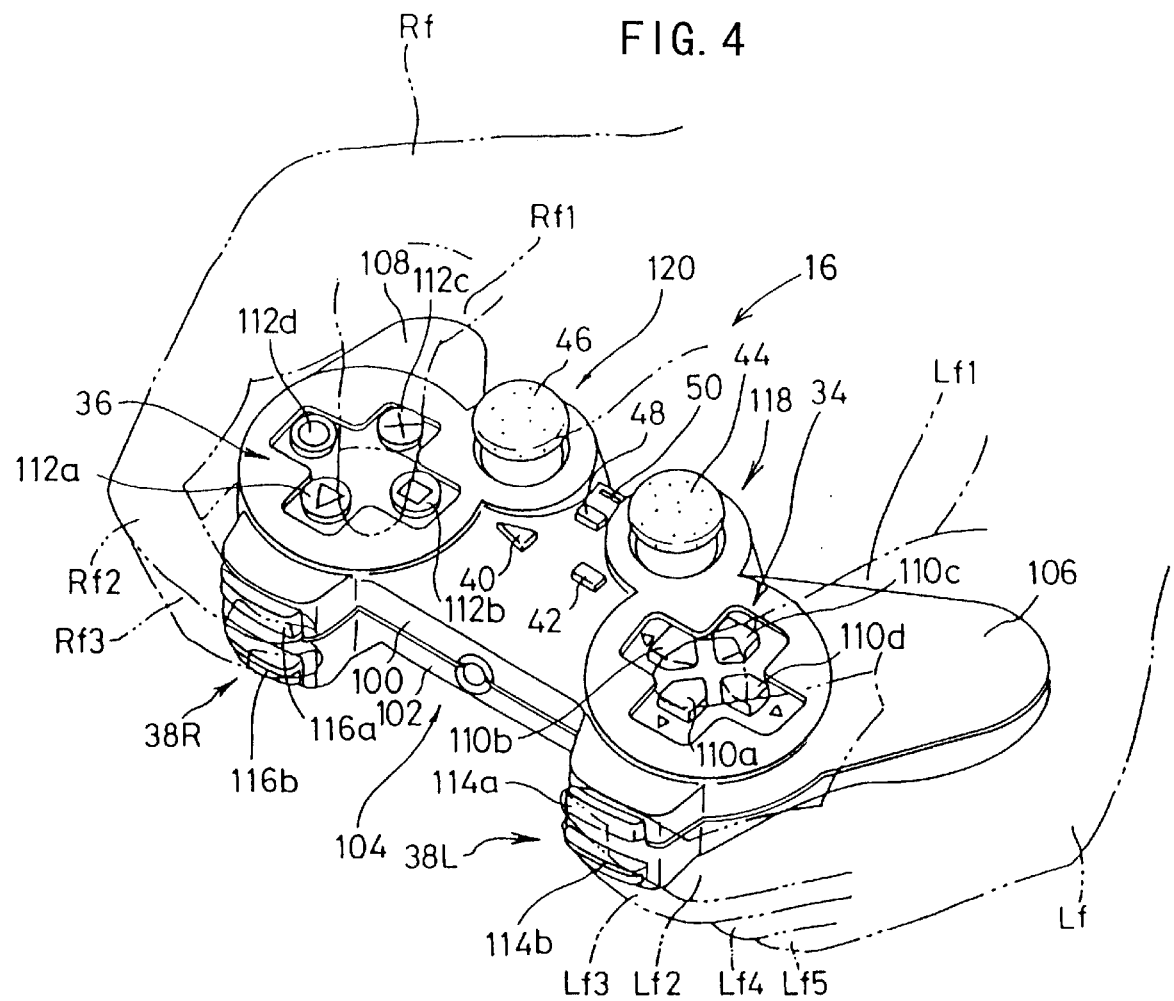
FIG. 4 is a perspective view showing the manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46.

Specifically, the control shafts of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, the functions of the first through fourth pressable control members 112a, 112b, 112c, 112d of the second control pad 36, and the functions of the pressable control members 114a, 114b and 116a, 116b of the L button 38L and the R button 38R are changed depending on the control mode selected by the pressed mode selection switch 48. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
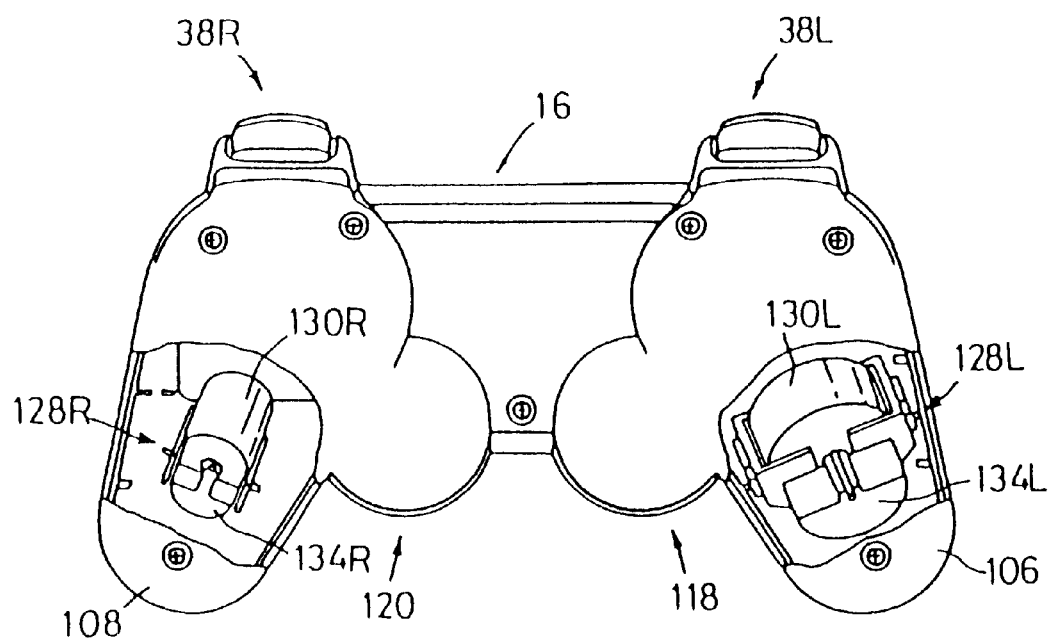
FIG. 5 is a bottom view, partly broken away, of the manual controller, showing vibration imparting mechanisms disposed respectively in left and right grips thereof.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R, 134L comprise a weight in the form of a heavy metal member having a semicircular cross-sectional shape. The weight has an off-center hole defined therein in which the drive shaft of the motor 130R, 130L are fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply either energized or de-energized according to the vibration value. If the vibration value (logic value) is "1", the motor 130R of the right vibration mechanism 128R is energized. If the vibration value is "0", the motor 130R of the right vibration mechanism 128R is de-energized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Now, circuit arrangements of the entertainment apparatus 12 and the manual controller 16 will be described below with reference to FIGS. 6 through 8.

Figure 6:
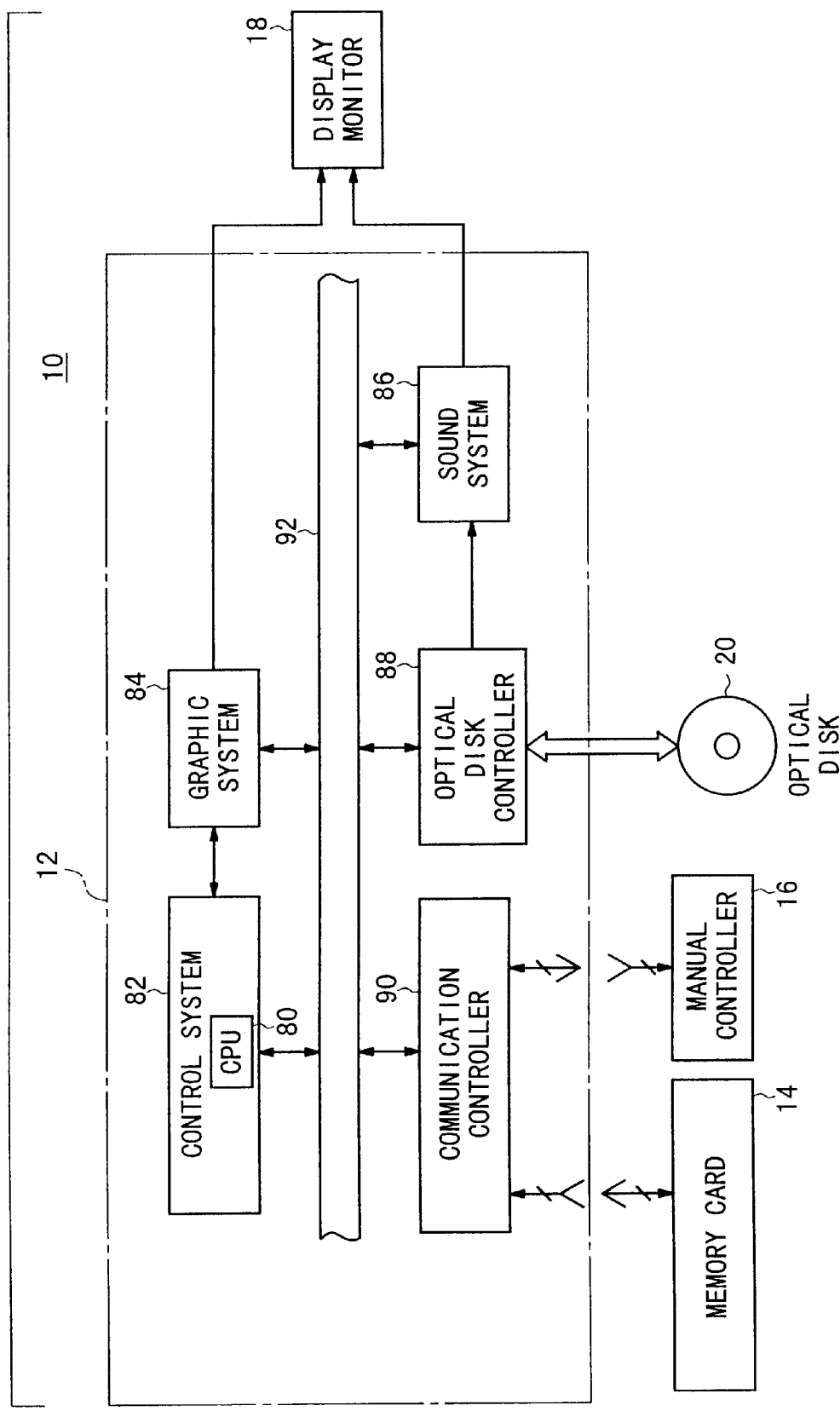
FIG. 6 is a block diagram of a circuit arrangement of an entertainment apparatus.

As shown in FIG. 6, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the monitor screen of the display monitor 18 and reproduce sounds from the speakers of the display monitor 18.

Figure 7:
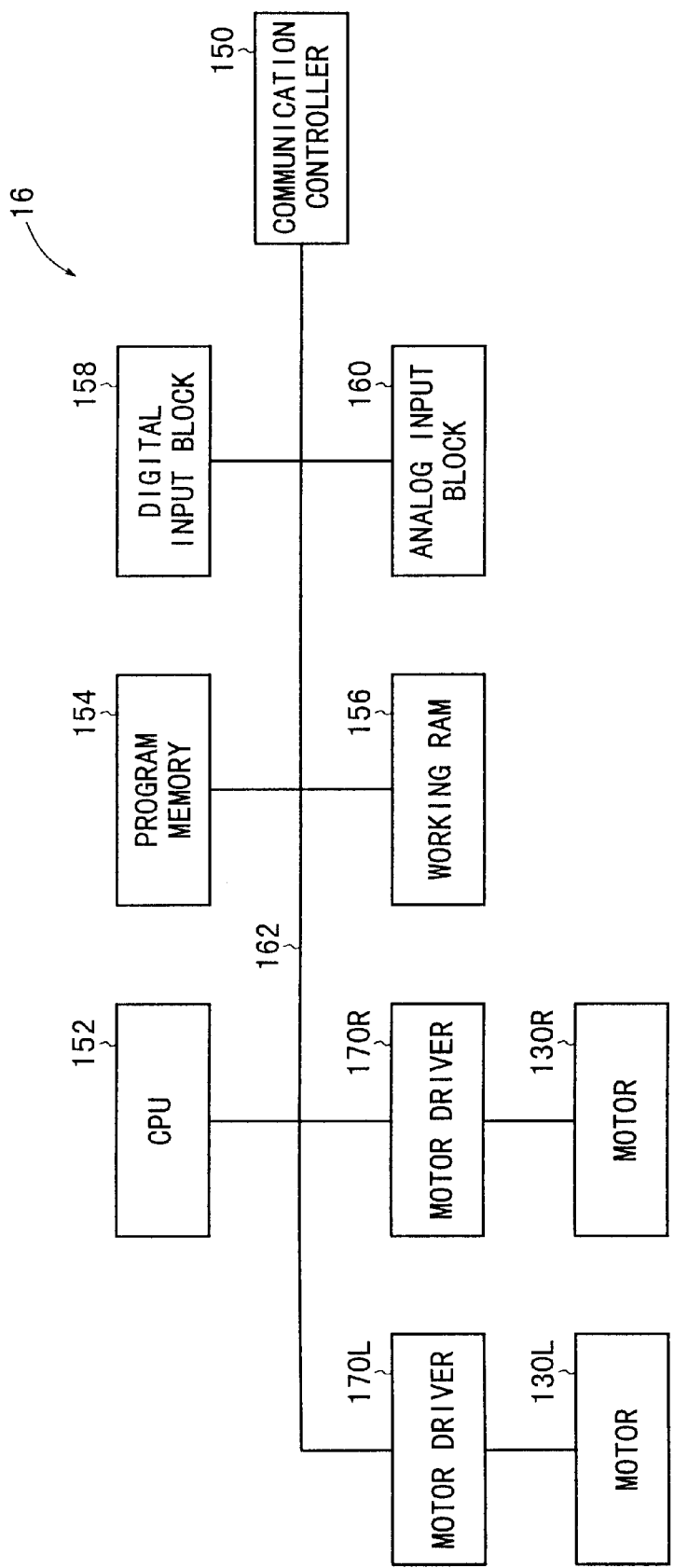
FIG. 7 is a block diagram of the manual controller.

As shown in FIG. 7, the manual controller 16 comprises a communication controller 150, a CPU 152, a program memory 154, a working RAM 156, a digital input block 158, an analog input block 160, a left motor driver 170L for energizing the left motor 130L, and a right motor driver 170R for energizing the right motor 130R. These components of the communication controller 16 are connected to a bus 162.

The digital input block 158 functions as a manual input controller for the pressable control members 110a–110d of the first control pad 34 and the pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 90 (see FIG. 6) of the entertainment apparatus 12, for example, for data communications with the entertainment apparatus 12.

Figure 8:
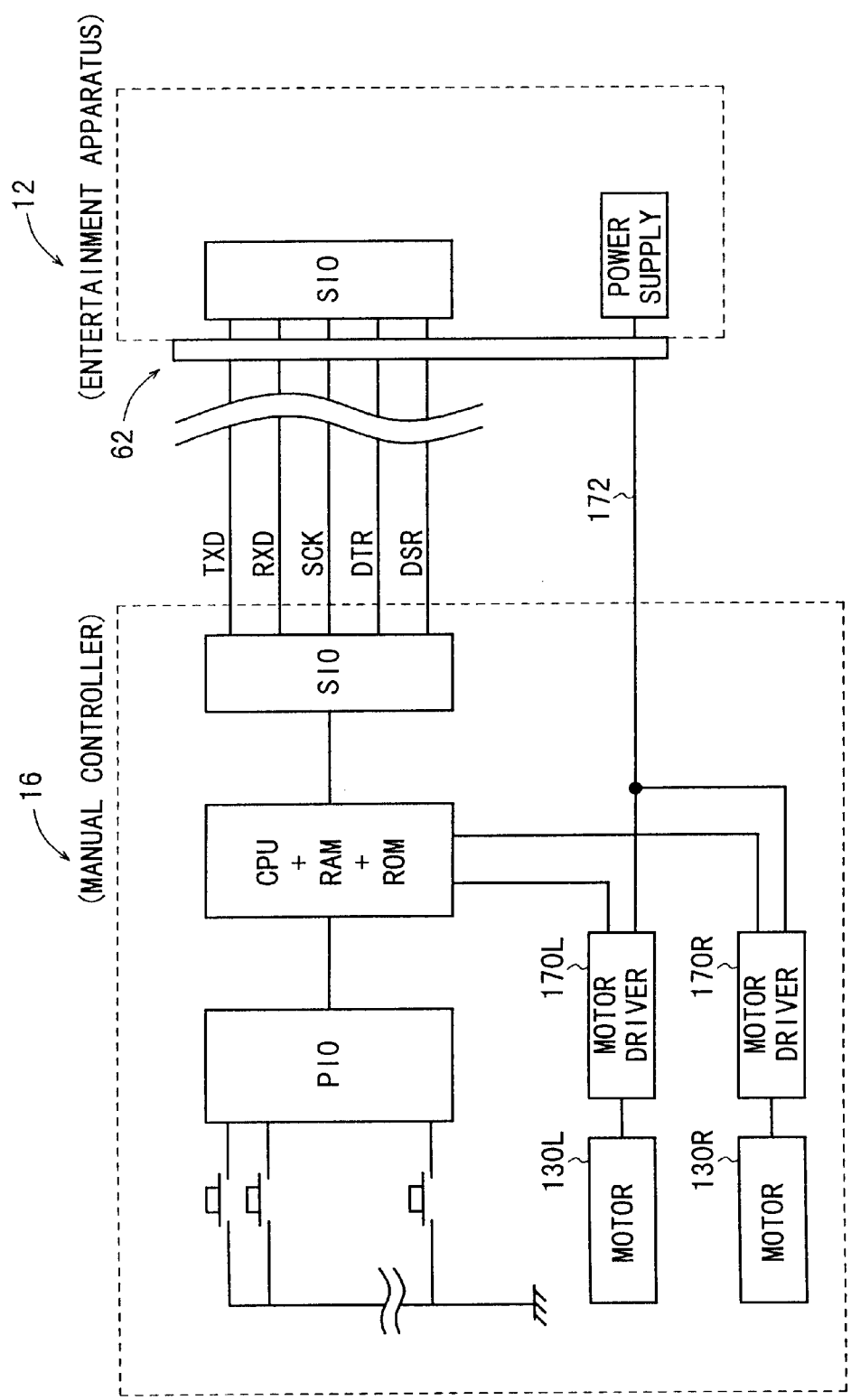
FIG. 8 is a block diagram of components for carrying out bidirectional serial communications between the manual controller and the entertainment apparatus.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a pair of motor drivers 170R, 170L for energizing the motors 130R, 130L of the vibration imparting mechanisms 128R, 128L. Each of the motors 130R, 130L is energized by a voltage and a current supplied from the motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the entertainment apparatus 12 and the manual controller 16. Other detailed structure of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. This cable further includes a power line 172 extending from a power supply in the entertainment apparatus 12 and connected to the motor drivers 170R, 170L in the manual controller 16 for supply electric energy to energize the motors 130R, 130L.

A process of bidirectional serial communication between the entertainment apparatus 12 and the manual controller 16 will be described below. In order for the entertainment apparatus 12 to communicate with the manual controller 16 to read control data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data from the digital input block 158 and the analog input block 160 via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data from the digital input block 158 and the analog input block 160 to the entertainment apparatus 12, and the entertainment apparatus 12 can send vibration generating commands for energizing the motors 130R, 130L of the vibration imparting mechanisms 128R, 128L via the data transfer signal line TXD to the manual controller 16.

The vibration generating commands for energizing the motors 130R, 130L include those which have been established in advance in the optical disk 20 set in the entertainment apparatus 12 and those which are newly generated in the entertainment apparatus 12.

A characteristic function of the entertainment system 10 according to the present embodiment will be described below with reference to FIGS. 9 through 26.

According to the characteristic function, an input pattern image displayed according to a command or control input entered from the manual controller 16 by the user is compared with a reference pattern image, and the control input is evaluated based on the level of similarity between the input pattern image and the reference pattern image.

The input pattern image is displayed according to an input signal from the manual controller 16, particularly, analog input values based on control actions made on the left and right joysticks 44, 46 by the user. However, the input pattern image may be displayed according to an input signal from another control buttons than the joysticks 44, 46.

Figure 10:
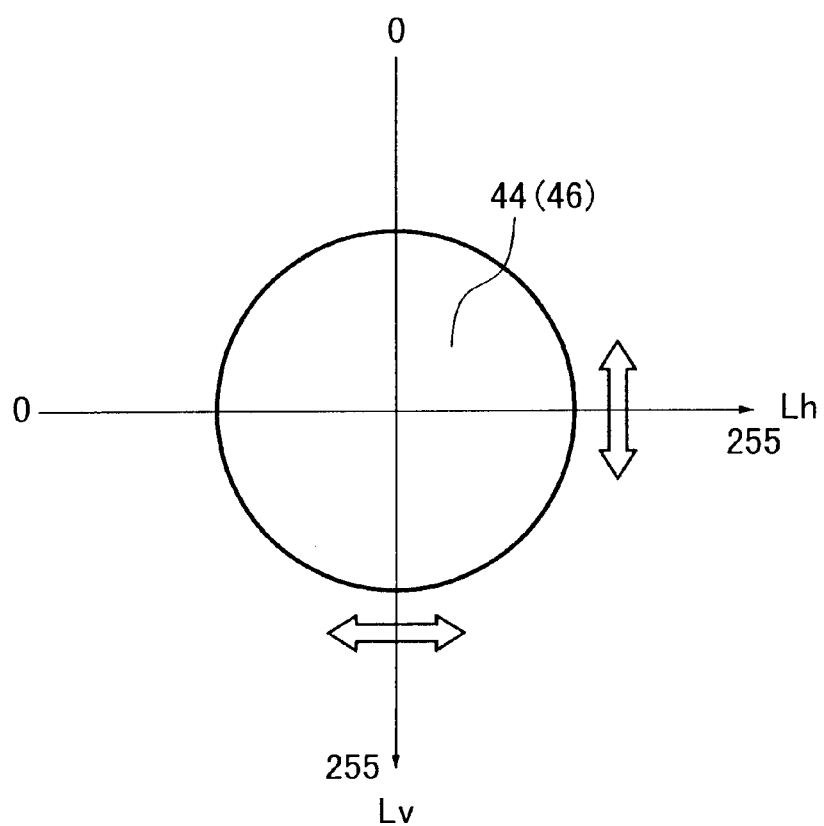
FIG. 10 is a diagram showing the relationship between vertical and horizontal values achieved when left and right joysticks are operated.

As shown in FIG. 10, the analog input values supplied from the left and right joysticks 44, 46 include vertical values ranging downward from "0" to "255" and horizontal values ranging rightward from "0" to "255". An tilt of the left and right joysticks 44, 46 can be determined according to the following calculation:

Tilt={(vertical value)$^2$+(horizontal value)$^2$}

Figure 9:
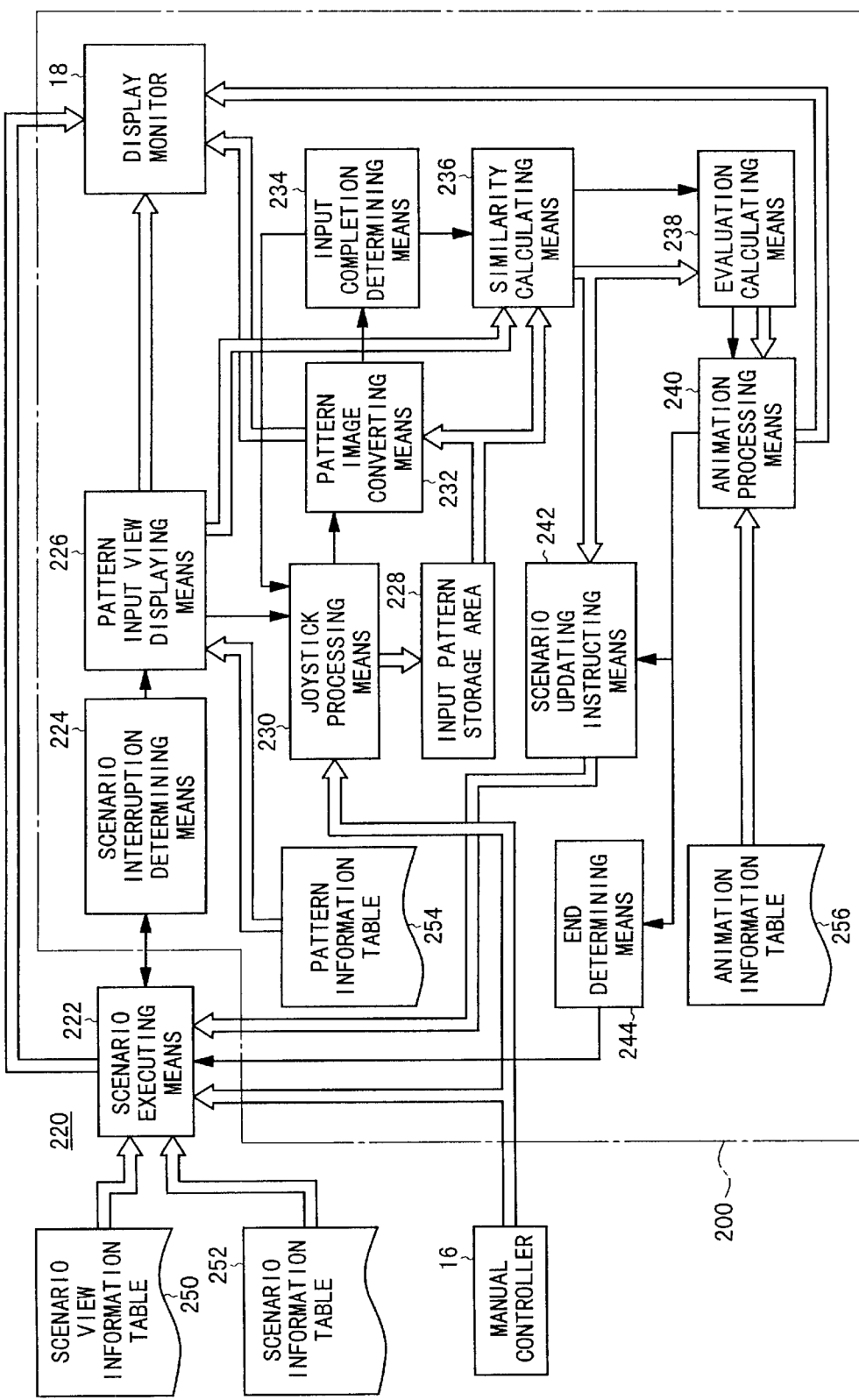
FIG. 9 is a functional block diagram of an input determining means and a game processing means according to the present invention.

The characteristic function, i.e., the function to compare an input pattern image displayed according to a command or control input entered from the manual controller 16 by the user with a reference pattern image, and evaluating the control input based on the level of similarity between the input pattern image and the reference pattern image, is achieved by executing an input determining means 200 shown in FIG. 9.

Prior to describing an arrangement and a processing sequence of the input determining means 200, a game, e.g., a sports game, incorporating the input determining means 200 will first be described below.

Figure 11:
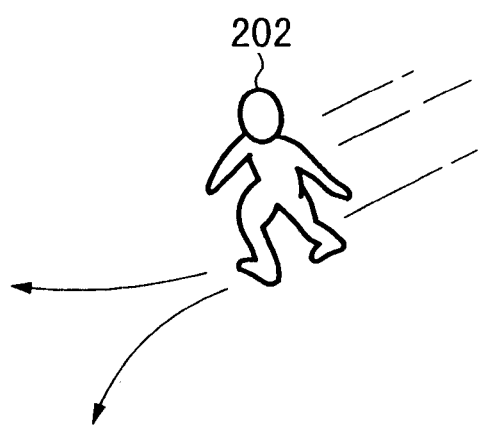
FIG. 11 is a view of a displayed image showing that a principal character is performing a normal level of skating.

In the game, as shown in FIG. 11, when a principal character 202 who is performing figure skating attempts to perform a difficult level of skating at a certain time, if the principal character 202 gets a score higher than a certain evaluation made by the input determining means 200, then the principal character 202 can proceed to a next event of sports.

Figure 12:
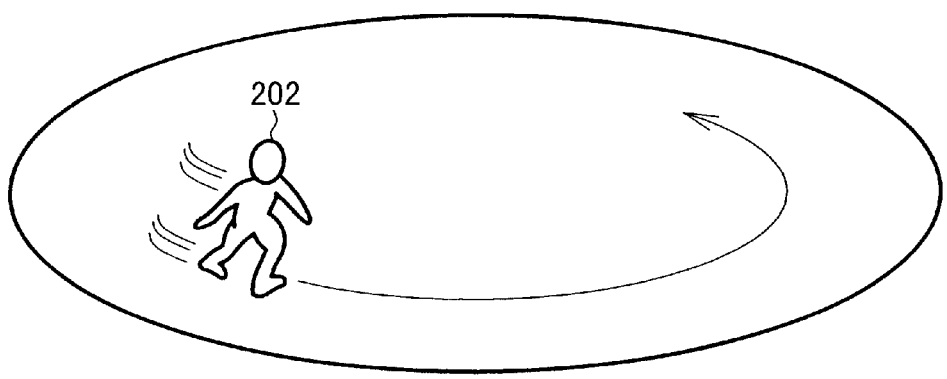
FIG. 12 is a view of a displayed image showing that the principal character is performing a difficult level of skating.
Figure 13:
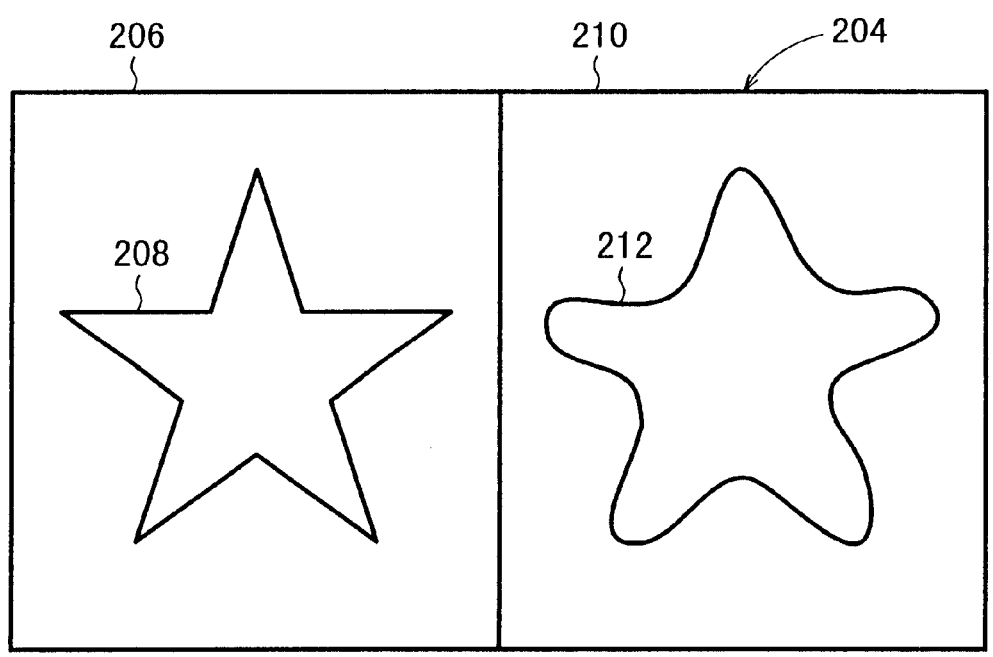
FIG. 13 is a view showing a displayed pattern input view.

For example, while the principal character 202 displayed on the display monitor 18 is skating on a skate rink according to a control input entered from the manual controller 16 by the user, when the user enters a command or control input for a performance of a higher level of difficulty, e.g., simultaneously presses the ○ button 112d and the X button 112c, the principal character 202 adopts a pose to do a performance of a higher level of difficulty, as shown in FIG. 12, and then the display monitor 18 displays a pattern input view 204, as shown in FIG. 13.

As shown in FIG. 13, the pattern input view 204 displays a reference pattern image 208 as a star-shaped image in a left reference display area 206 and an input pattern image 212 according to a control input from the user in a right reference display area 210.

The user sets a start point with the ○ button 112d, for example, and then plots the input pattern image 212 from the start point by operating the left joystick 44, for example.

When the plotting of the input pattern image 212 is completed, the reference pattern image 208 and the input pattern image 212 are compared with each other, and the level of similarity, ranging from 0 to 100%, between the reference pattern image 208 and the input pattern image 212 is calculated. The calculated level of similarity is evaluated according to a five-level scale.

Figure 14:
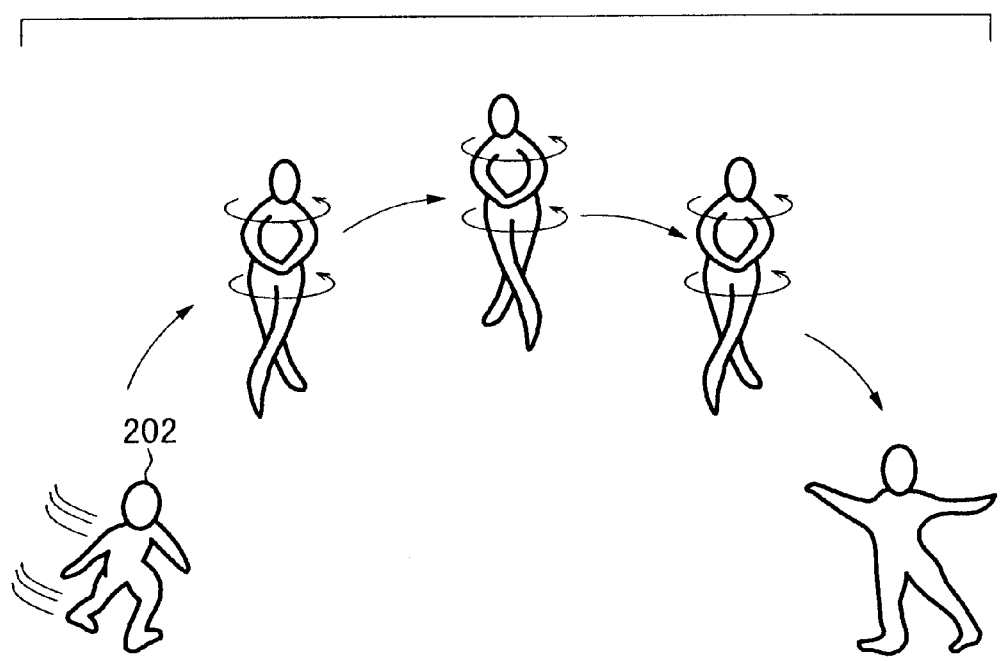
FIG. 14 is a view of a displayed image of an animated performance which is given a highest evaluation level "5"

If the given evaluation is of a highest level "5", then, as shown in FIG. 14, an animated performance is displayed, showing that the principal character 202 smoothly performs a highly difficult level of skating, e.g., a threeturn jump, without a mistake.

Figure 15:
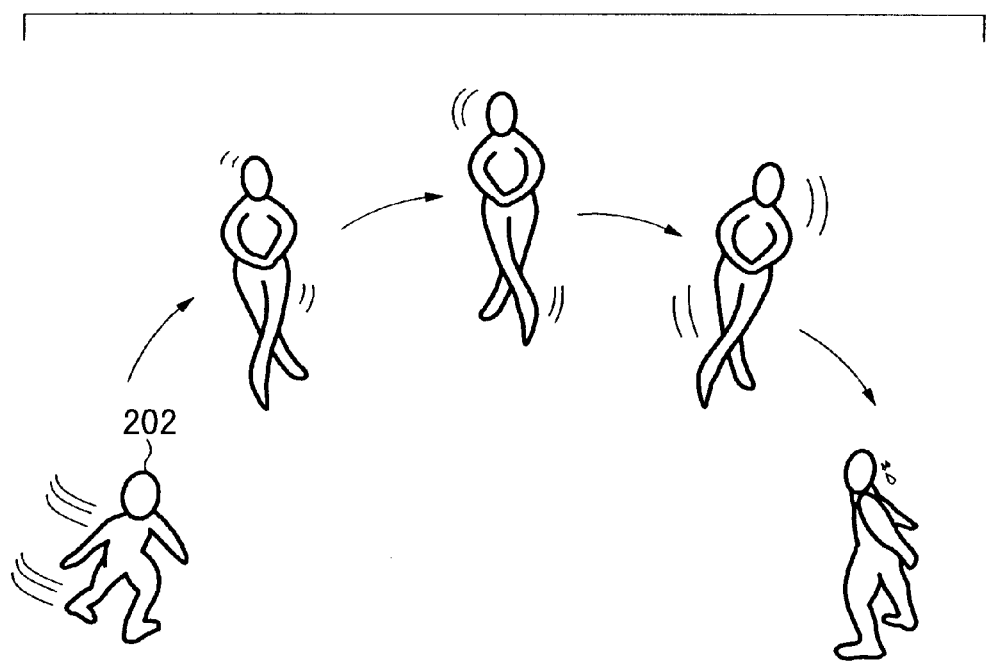
FIG. 15 is a view of a displayed image of an animated performance which is given an evaluation level "4"
Figure 16:
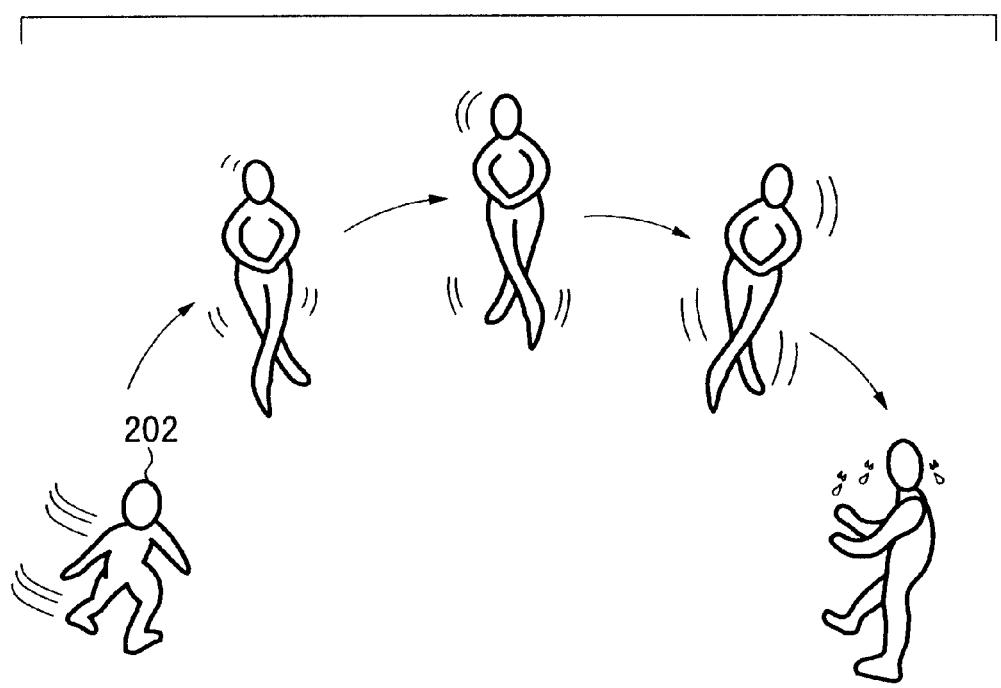
FIG. 16 is a view of a displayed image of an animated performance which is given an evaluation level "3"

If the given evaluation is of a level "4", then, as shown in FIG. 15, an animated performance is displayed, showing that the principal character 202 performs a lower level of skating which is slightly less smooth than the skating of the evaluation level "5". If the given evaluation is of a level "3", then, as shown in FIG. 16, an animated performance is displayed, showing that the principal character 202 performs a much lower level of skating which is less smooth than the skating of the evaluation level "4" with a slight mistake.

Figure 17:
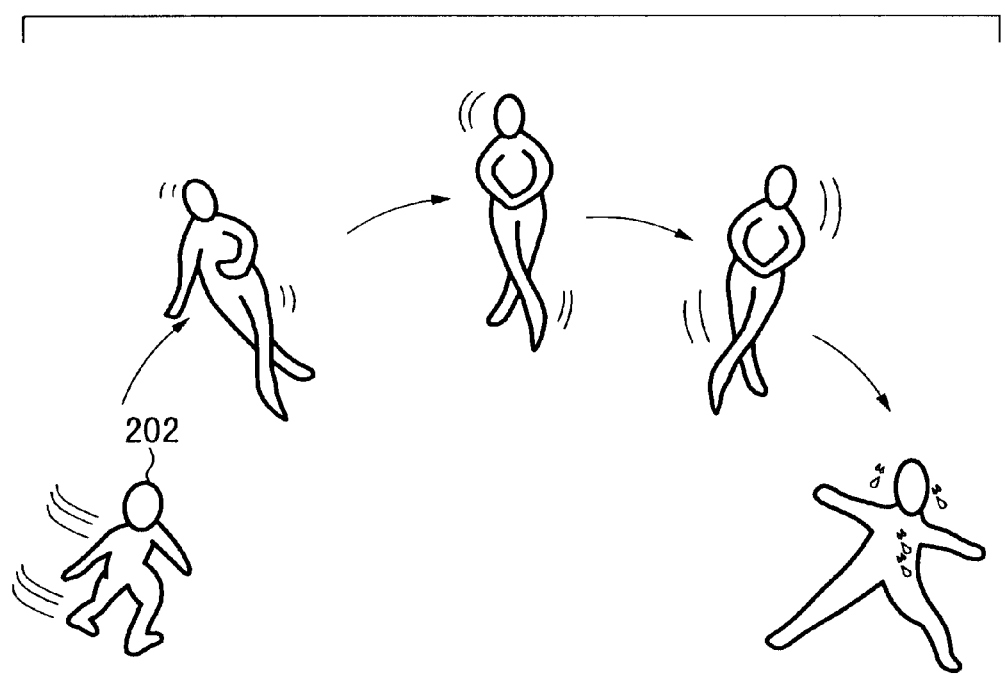
FIG. 17 is a view of a displayed image of an animated performance which is given an evaluation level "2"
Figure 18:
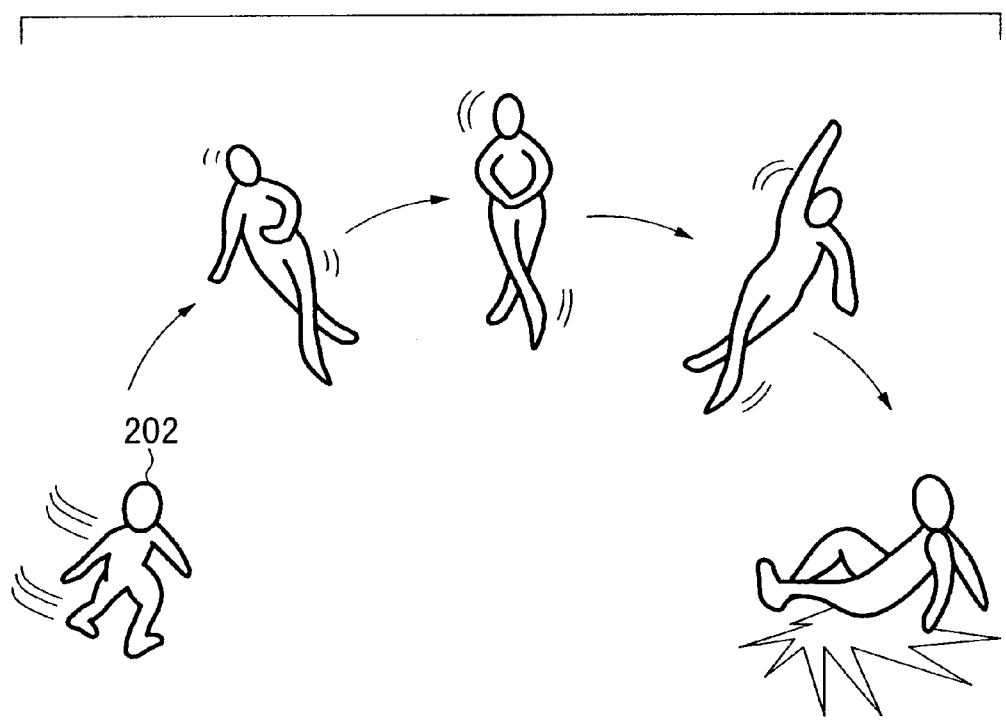
FIG. 18 is a view of a displayed image of an animated performance which is given a lowest evaluation level "1"

If the given evaluation is of a level "2", then, as shown in FIG. 17, an animated performance is displayed, showing that the principal character 202 performs a far lower level of skating which is not smooth with a greater mistake. If the given evaluation is of a level "1", then, as shown in FIG. 18, an animated performance is displayed, showing that the principal character 202 performs a lowest level of skating and finally falls down.

If the level of similarity is equal to or higher than a certain value, e.g., 75%, then the video game goes to a scenario of a next sport event, e.g., gymnastics individual all-around or one of freestyle sports such as snowboard, ski, wind surfing, etc.

Each time the user finishes a sports event, the line drawing of the reference pattern image 208 may be made more complex, making it more difficult for the user to achieve a higher level of difficulty.

The reference pattern image 208 displayed in the reference display area 206 may comprise any desired image such as a circular image, a triangular image, a rectangular image, a lozenge image, etc. that can be drawn by a continuous line, rather than the star-shaped image shown in FIG. 13.

Figure 19:
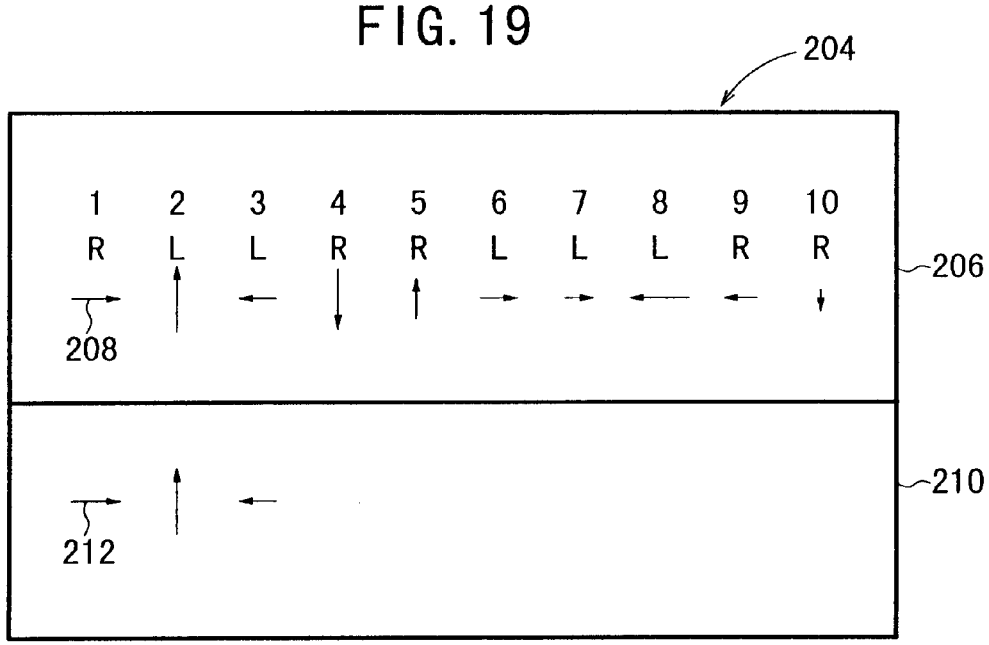
FIG. 19 is a view of another reference pattern image displayed in a reference display area of the pattern input view.

In FIG. 13, the user tries to plot the input pattern image 212 in an attempt to match the star-shaped reference pattern image 208 displayed in the reference display area 206. However, as shown in FIG. 19, the user may plot an input pattern image 212 in an attempt to match various arrows displayed in the reference display area 206. The letters "R", "L" displayed over the arrows indicate that the user should plot the input pattern image 212 using the right joystick 46 and the left joystick 44, respectively.

For example, the first arrow with the letter "R" indicates that the user should plot a rightward arrow having an ordinary length using the right joystick 46, and the second arrow with the letter "L" indicates that the user should plot an upward arrow having an length twice the ordinary length using the left joystick 44. Similarly, the tenth arrow with the letter "R" indicates that the user should plot a downward arrow having a length half the ordinary length using the right joystick 46.

Each level of similarity may calculated individually for each of the arrows, and control inputs may be evaluated based on the average of the levels of similarity with respect to ten arrows.

Figure 20:
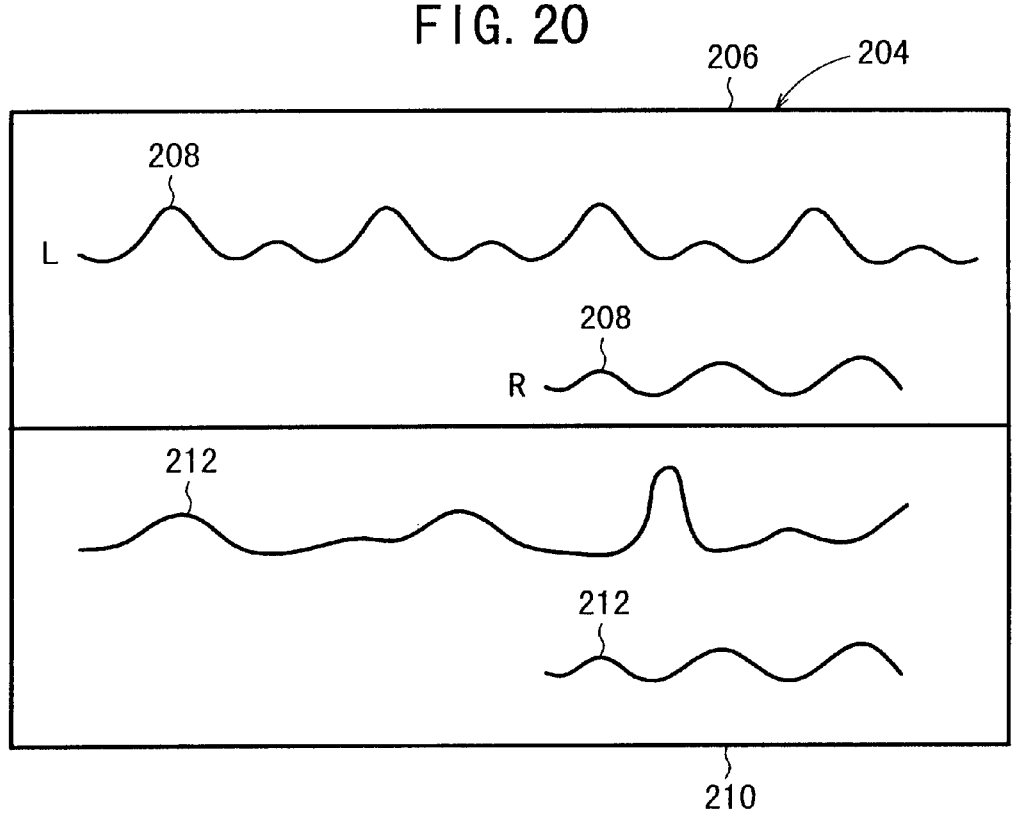
FIG. 20 is a view of still another reference pattern image displayed in the reference display area of the pattern input view.

As shown in FIG. 20, the reference pattern image 208 may comprise any desired waveform. The reference pattern image 208 in form of a desired waveform may change with time, and the user may enter the input pattern image 212 in the form of a waveform while predicting or seeing how the reference pattern image 208 changes. The user may enter waveforms using the left joystick 44 and the right joystick 46, respectively.

The waveform entered as the input pattern image 212 and the waveform entered as the reference pattern image 208 may be compared with each other in a real-time fashion, and the level of similarity therebetween may be calculated at intervals of 1 seconds. The calculated level of similarity as it changes from time to time may be displayed on the display monitor 18.

An arrangement of the input determining means 200 as applied to the game shown in FIGS. 11 through 18 will be described below with reference to FIG. 9 and FIGS. 21 through 26.

As shown in FIG. 9, the input determining means 200 is included in a game processing means 220 for playing a sports game. The game processing means 220 has a scenario executing means 222 for executing various scenarios for the sports game and interrupting the progress of a scenario according to a command from the user, and the input determining means 200.

The input determining means 200 comprises a scenario interruption determining means 224 for determining whether a scenario presently in progress is interrupted or not, a pattern input view displaying means 226 for displaying a pattern input view 204 (see FIG. 13) on the display monitor 18 and displaying a reference pattern image 208 in the reference display area 206, a joystick processing means 230 for writing input data from the joysticks 44, 46 successively in an input pattern storage area 228, a pattern image converting means 232 for converting input data stored in the input pattern storage area 228 into an input pattern image 212 and displaying the input pattern image 212 in the input display area 210 of the pattern input view 204, and an input completion determining means 234 for determining the completion of inputs from the joysticks 44, 46.

The input determining means 200 also comprises a similarity calculating means 236 for comparing the input pattern image 212 and the reference pattern image 208 with each other and calculating a level of similarity therebetween according to a pattern matching process, for example, an evaluation calculating means 238 for evaluating a control input from the manual controller 16 based on the calculated level of similarity, an animation processing means 240 for displaying an animation based on the present evaluation on the display monitor 18, a scenario updating instructing means 242 for determining and instructing a scenario progress based on the present level of similarity, and an end determining means 244 for determining whether there is an end request to end the processing sequence of the game processing means 220 or not.

The input determining means 200 uses a scenario view information table 250, a scenario information table 252, a pattern information table 254, and an animation information table 256.

As shown in FIG. 21, the scenario view information table 250 has a plurality of records each storing a leading storage address for reading view data of a scenario executed by the scenario executing means 222 from the optical disk 20, for example. A record read from the scenario view information table 250 is sequentially updated according to an obtained evaluation.

Figure 22:
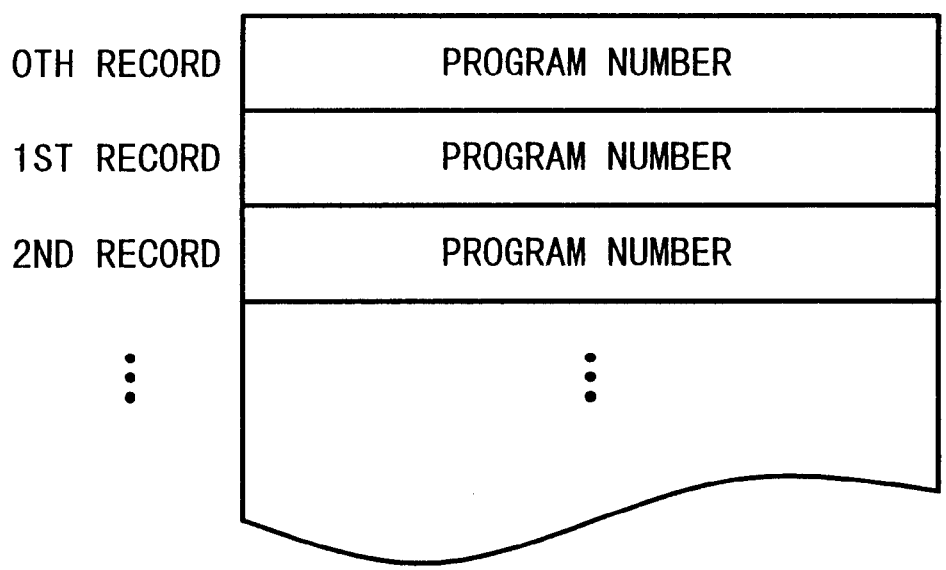
FIG. 22 is a diagram showing details of a scenario information table.

As shown in FIG. 22, the scenario information table 252 has a plurality of records each storing the number of a program, which places a scenario in progress, executed by the scenario executing means 222. A record read from the scenario information table 252 is sequentially updated according to an obtained evaluation.

Figure 23:
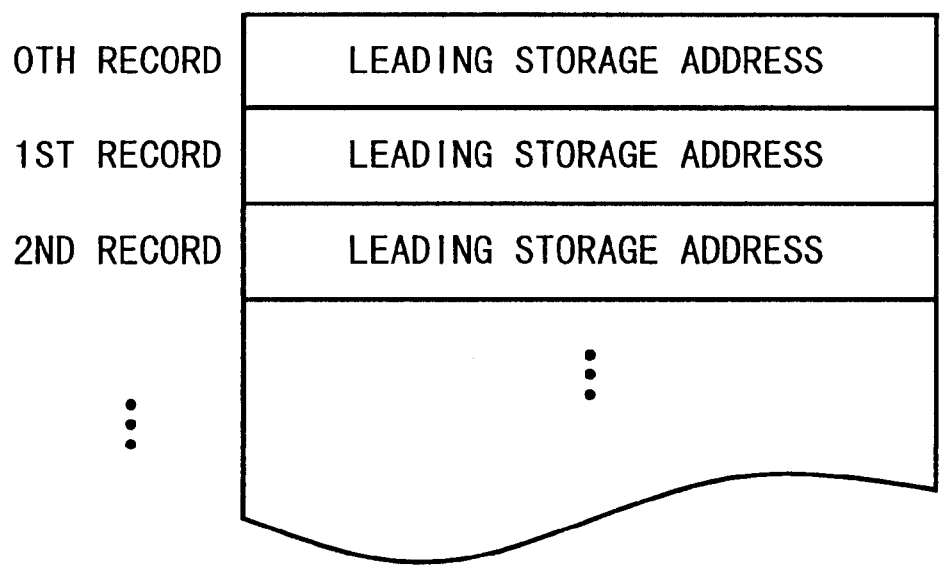
FIG. 23 is a diagram showing details of a pattern information table.

As shown in FIG. 23, the pattern information table 254 has a plurality of records each storing a leading storage address for reading a reference pattern image 208 to be displayed in the reference display area 206 from the optical disk 20, for example.

As shown in FIG. 24, the animation information table 256 has a plurality of records each storing a leading storage address for reading animation data corresponding to an evaluation from the optical disk 20, for example. If the given evaluation is of a highest level "5", then animation data is read from the leading storage address that is read from the 0th record, and if the given evaluation is of a level "4", then animation data is read from the leading storage address that is read from the 1st record.

A processing sequence of the input determining means 200 and a processing sequence of the game processing means 220 will be described below with reference to FIGS. 25 and 26.

Figure 25:
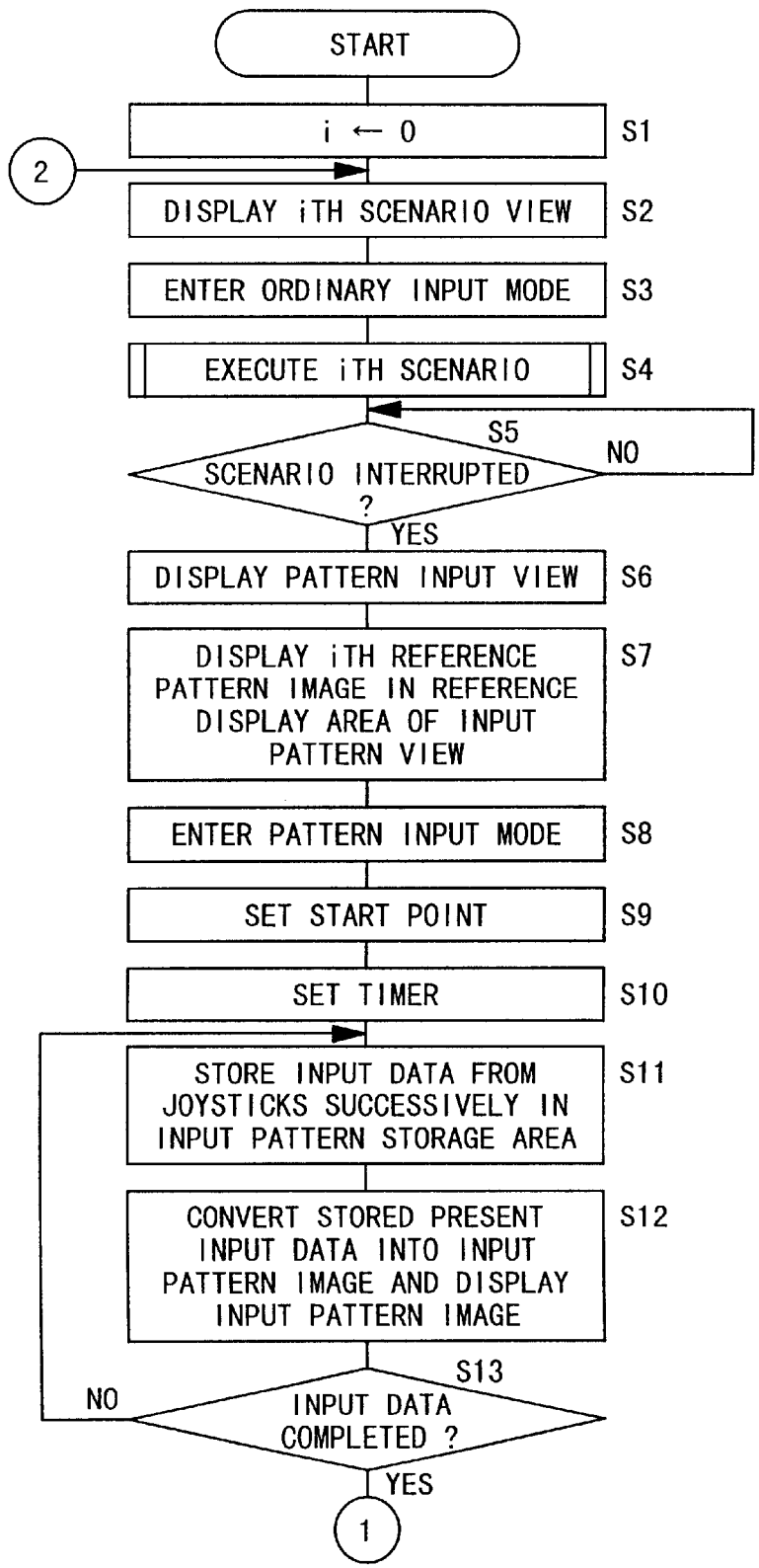
FIGS. 25 and 26 are a flowchart of a processing sequence of the game processing mean and the input determining means.

In step S1 shown in FIG. 25, the game processing means 220 stores an initial value "0" in an index register i used to update a scenario, thereby initializing the index register i.

In step S2, the scenario executing means 222 displays an ith scenario view on the display monitor 18. Specifically, the scenario executing means 222 reads the leading storage address storing image data of a scenario view to be presently displayed from an ith record in the scenario view information table 250, reads image data of a present scenario view from the read leading storage address in a storage area of the optical disk 20 where various scenario views are stored, and outputs the read image data to the display monitor 18 which then displays the desired scenario view based on the read image data.

In step S3, the game processing means 220 enters an ordinary input mode. The ordinary input mode is a mode for performing predetermined processes for the respective control buttons of the manual controller 16 depending on control inputs from the control buttons.

In step S4, the scenario executing means 222 executes an ith scenario. Specifically, the scenario executing means 222 reads the number of a program (program number) to be presently executed from the ith record in the scenario information table 252, and executes the program.

In step S5, the scenario interruption determining means 224 determines whether the scenario presently in progress is interrupted or not by monitoring an interruption flag which is indicative of a scenario interruption. In each scenario, such an interruption flag is set immediately before a pattern image is inputted.

If the scenario presently in progress is related to figure skating, then the display of images is interrupted when the scene of the ordinary level of skating shown in FIG. 11 changes to the scene of the difficult level of skating shown in FIG. 12.

If the scenario is interrupted, then control goes to step S6 in which the pattern input view displaying means 226 displays the pattern input view 204 on the screen of the display monitor 18 (see FIG. 13).

In step S7, the pattern view displaying means 226 displays an ith reference pattern image in the reference display area 206 of the pattern input view 204.

Specifically, the pattern input view displaying means 226 reads the leading storage address which stores data of the reference pattern image 208 to be presently displayed from an ith record of the pattern information table 254, reads image data of the present reference pattern image 208 from the read leading storage address in a storage area of the optical disk 20 where various reference pattern images 208 are stored, and outputs the read image data to the display monitor 18.

Therefore, the reference display area 206 of the pattern input view 204 displays the reference pattern image 208 based on the read image data. In FIG. 13, the reference display are a 206 display s the star-shaped reference pattern image 208.

In step S8, the input determining means 200 enters a pattern input mode. Unlike th e ordinary input mode, the pattern input mode is a mode for permitting only inputs from the joysticks 44, 46 and the ○ button 112d, which serves as a decision button, and storing input data from the joysticks 44, 46 after a start point has been decided successively in a given storage area.

In step S9, the user sets a start point by setting start point coordinates with the left joystick 44, for example, and then deciding the start point by pressing the decision button 112d. Then, a timer is set in step S10.

In step S11, the joystick processing means 230 stores input data from the joysticks 44, 46 successively in the input pattern storage area 228.

In step S12, the pattern image converting means 232 converts the input data stored in the input pattern storage area 228 into an input pattern image 212, and displays the input pattern image 212 in the input display area 210 of the pattern input view 204.

In step S13, the input completion determining means 234 determines whether the inputs from the joysticks 44, 46 are completed or not based on whether there is an input from the decision button 112d, for example.

In the inputs from the joysticks 44, 46 are not completed, then control goes back to step S11 for converting the input data from the joysticks 44, 46 into an input pattern image 212 and displaying the input pattern image 212 in the input display area 210.

Figure 26:
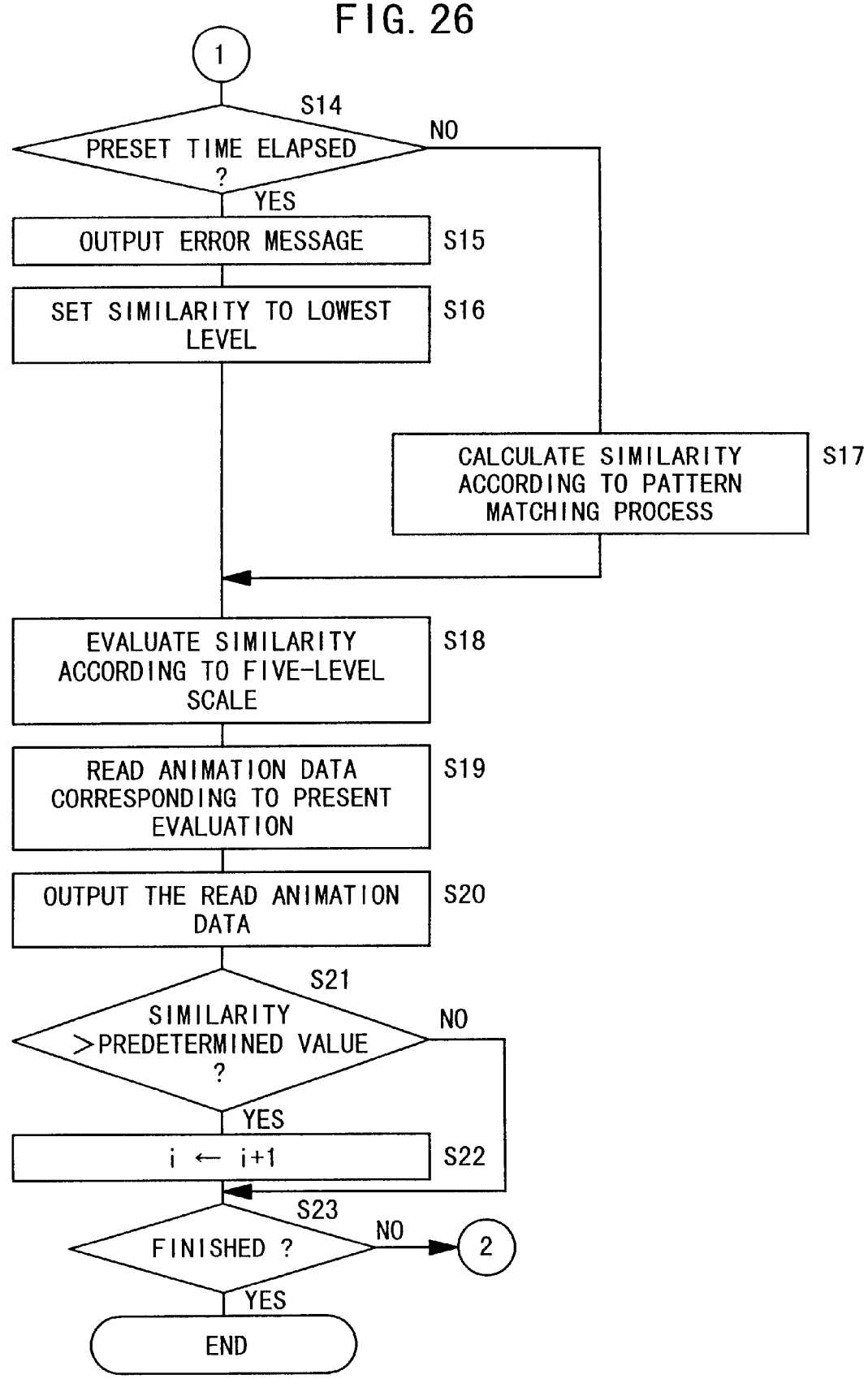

If the inputs from the joysticks 44, 46 are completed, i.e., if the decision button 112d is pressed, then control goes to step S14 shown in FIG. 26 in which the similarity calculating means 236 determines whether a preset time has elapsed or not. The preset time may be, for example, ten seconds after the timer is set.

If the preset time has elapsed, then control goes to step S15 in which the display monitor 18 displays an error message. In step S16, the similarity calculating means 236 sets similarity to a lowest level (0%).

If the preset time has not elapsed, then control goes to step S17 in which the similarity calculating means 236 calculates the level of similarity, ranging from 0 to 100%, according to a pattern matching process, for example. A template pattern matching process, which is one of various versions of the pattern matching process, may be used.

If the template pattern matching process is used, then while the reference pattern image 208 displayed in the reference display area 206 is being moved with respect to the input pattern image 212 displayed in the input display area 210, the similarity calculating means 236 calculates similarity at each set of coordinates, and detects a set of coordinates where similarity is at a highest level. The highest level of similarity is set as the present level of similarity.

After step S16 or S17, control goes to step S18 in which the evaluation calculating means 238 evaluates the calculated similarity according to a five-level scale. If the calculated similarity lies between 80% and 100%, then it is given a highest evaluation level "5". If the calculated similarity lies between 60% and 79%, then it is given an evaluation level "4". If the calculated similarity lies between 40% and 59%, then it is given an evaluation level "3".

If the calculated similarity lies between 20% and 39%, then it is given an evaluation level "2". If the calculated similarity lies between 0% and 19%, then it is given a lowest evaluation level "1".

In step S19, the animation processing means 240 reads animation data corresponding to the present evaluation. Specifically, the animation processing means 240 reads the leading storage address from a record corresponding to the evaluation in the animation information table 256, and reads animation data corresponding to the present evaluation from the read leading storage address in an storage area of the optical disk 20 where various animation data are stored.

In step S20, the animation processing means 240 outputs the read animation data to the display monitor 18 which displays an animation corresponding to the present evaluation based on the read animation data.

For example, if the evaluation is of the highest level "5", then, as shown in FIG. 14, an animated performance is displayed, showing that the principal character 202 smoothly performs a highly difficult level of skating, e.g., a threeturn jump, without a mistake. If the given evaluation is of the level "4", then, as shown in FIG. 15, an animated performance is displayed, showing that the principal character 202 performs a lower level of skating which is slightly less smooth than the skating of the evaluation level "5".

If the given evaluation is of the level "3", then, as shown in FIG. 16, an animated performance is displayed, showing that the principal character 202 performs a much lower level of skating which is less smooth than the skating of the evaluation level "4" with a slight mistake. If the given evaluation is of the level "2", then, as shown in FIG. 17, an animated performance is displayed, showing that the principal character 202 performs a far lower level of skating which is not smooth with a greater mistake. If the given evaluation is of the lowest level "1", then, as shown in FIG. 18, an animated performance is displayed, showing that the principal character 202 performs a lowest level of skating and finally falls down.

In step S21, the scenario updating instructing means 242 determines whether the present level of similarity, ranging from 0 to 100%, is greater than a predetermined value, e.g., 75%. If the present level of similarity is greater than the predetermined value, then control goes to step S22 in which the scenario updating instructing means 242 increments the value of the index register i by +1.

In step S23, the end determining means 244 determines whether there is an end request to end the processing sequence of the game processing means 220 or not. If there is no end request, then control goes back to step S2 to cause the scenario executing means 222 to execute a scenario.

If the present level of similarity is greater than the predetermined value, then the sports game goes to a scenario, e.g., gymnastics individual all-around or one of freestyle sports such as snowboard, ski, wind surfing, etc. in a next processing cycle of the scenario executing means 222. If the present level of similarity is lower than the predetermined value, then the present scenario, i.e., figures skating, is executed again.

If there is an end request in step S23, then the processing sequence of the game processing means 220 including the input determining means 200 is finished.

In the entertainment system 10 according to the present invention, as described above, the input determining means 200 compares an input pattern image 212 plotted according to a control input from the manual controller 16 and a reference pattern image 208 with each other, and evaluates the control input based on the level of similarity between the input pattern image 212 and the reference pattern image 208. Therefore, the control input is evaluated in an analog fashion, rather than on a digital evaluation based on the agreement and disagreement between the input pattern image 212 and the reference pattern image 208, for thereby providing the game with detailed settings for its progress.

In the illustrated embodiment, the input determining means 200 has the scenario updating instructing means 242 for changing the progress of a scenario executed by the game processing means 220 based on the evaluation obtained by the evaluation calculating means 238. Therefore, the game may proceed to a next scenario or repeat the present scenario depending on the obtained evaluation.

Furthermore, the input determining means 200 has the animation processing means 240 for displaying an animation depending on the evaluation obtained by the evaluation calculating means 238. Consequently, the evaluation can be displayed in not only a numerical value, but also as an animation.

Inasmuch as the principal character 202 displayed on the display monitor 18 performs different detailed levels of an event depending on how good the control input from the user is, e.g., how the timing or direction of the control input is selected by the user, an element of fun is added to the progress of the game.

The input determining means 200 may be used not only to judge achieved levels in the above sport game, but also to make various decisions in decision routines necessary in various games, e.g., to determine which direction the user is to go in, or determine whether the user has won a fight against a monster. Therefore, the input determining means 200 can contribute to the construction of games which are not boring, but highly fun to play.

Although a certain preferred embodiment of the present invention has been shown and described in detail, it should be understood that various changes and modifications may be made therein without departing from the scope of the appended claims.

What is claimed is:

1. An entertainment system comprising:

an entertainment apparatus for executing various programs;

at least one manual controller for entering control requests from a user into said entertainment apparatus;

a display unit for displaying images outputted from said entertainment apparatus;

input determining means for comparing an input pattern image displayed according to a control input entered from said manual controller and a reference pattern image with each other, and producing an evaluation of the control input based on the level of similarity between the input pattern image and the reference pattern image, wherein said input determining means comprises:

image converting means for converting the control input from said manual controller into the input pattern image, similarity calculating means for comparing said input pattern image and said reference pattern image with each other, and determining a level of similarity therebetween from among plural levels of similarity, and evaluation calculating means for producing the evaluation of the control input based on the determined level of similarity; and progress changing means for changing the progress of a program executed by said entertainment apparatus based on the evaluation produced by said evaluation calculating means, wherein said progress of the program comprises the execution of a scenario, and said progress changing means further comprises means for changing the scenario based on the evaluation produced by said evaluation calculating means.

2. An entertainment system according to claim 1, wherein said manual controller has an analog input block, and said image converging means comprises:

means for generating said input pattern image based on data from said analog input block.

3. An entertainment system according to claim 1, wherein said input determining means includes:

animation processing means for displaying an animation depending on the evaluation produced by said evaluation calculating means.

4. The entertainment system according to claim 1, wherein said reference pattern image comprises a plurality of arrows oriented in different directions and having different lengths, respectively, and said input pattern image comprises a plurality of user-input arrows input using respective joysticks of said manual controller, and wherein respective levels of similarity are calculated individually for each of said user-input arrows, and said evaluation calculating means calculates an average of said levels of similarity for producing said evaluation of the control input.

5. The entertainment system according to claim 1, wherein said reference pattern image comprises a changing waveform that changes over time, and said input pattern image comprises a user-input waveform input using at least one joystick of said manual controller while observing said changing waveform, and wherein said level of similarity is recalculated at respective intervals, and the calculated level of similarity is displayed as said level of similarity changes over time.

6. An entertainment apparatus for connection to at least a manual controller for outputting a control request from a user and a display unit for displaying images, comprising:

input determining means for comparing an input pattern image displayed according to a control input entered from said manual controller and a reference pattern image with each other, and producing an evaluation of the control input based on the level of similarity between the input pattern image and the reference pattern image, wherein said input determining means comprises:

image converting means for converting the control input from said manual controller into the input pattern image, similarity calculating means for comparing said input pattern image and said reference pattern image with each other, and determining a level of similarity therebetween from among plural levels of similarity, and evaluation calculating means for producing the evaluation of the control input based on the determined level of similarity; and progress changing means for changing the progress of a program executed by said entertainment apparatus based on the evaluation produced by said evaluation calculating means, wherein said progress of the program comprises the execution of a scenario, and said progress changing means further comprises means for changing the scenario based on the evaluation produced by said evaluation calculating means.

7. The entertainment apparatus according to claim 6, wherein said reference pattern image comprises a plurality of arrows oriented in different directions and having different lengths, respectively, and said input pattern image comprises a plurality of user-input arrows input using respective joysticks of said manual controller, and wherein respective levels of similarity are calculated individually for each of said user-input arrows, and said evaluation calculating means calculates an average of said levels of similarity for producing said evaluation of the control input.

8. The entertainment apparatus according to claim 6, wherein said reference pattern image comprises a changing waveform that changes over time, and said input pattern image comprises a user-input waveform input using at least one joystick of said manual controller while observing said changing waveform, and wherein said level of similarity is recalculated at respective intervals, and the calculated level of similarity is displayed as said level of similarity changes over time.

9. A computer-readable medium storing a program and data for use in an entertainment system having an entertainment apparatus for executing various programs, at least one manual controller for entering control requests from a user into said entertainment apparatus, and a display unit for displaying images outputted from said entertainment apparatus, said program comprising the steps of:

comparing an input pattern image displayed according to a control input entered from said manual controller and a reference pattern image with each other;

converting the control input from said manual controller into the input pattern image;

comparing said input pattern image and said reference pattern image with each other, and determining a level of similarity therebetween from among plural levels of similarity;

producing an evaluation of the control input based on the determined level of similarity; and changing the progress of a program executed by said entertainment apparatus based on the produced evaluation, wherein said progress of the program comprises the execution of a scenario, and said scenario is changed based on the produced evaluation.

10. A computer-readable medium according to claim 9, wherein said manual controller has an analog input block, and said step of converting the control input comprises the step of:

generating said input pattern image based on data from said analog input block.

11. A computer-readable medium according to claim 9, wherein said steps include the step of:

displaying an animation depending on the produced evaluation.

12. The computer-readable medium according to claim 9, wherein said reference pattern image comprises a plurality of arrows oriented in different directions and having different lengths, respectively, said program further comprising the steps of:

inputting said input pattern image comprising a plurality of user-input arrows input by using respective joysticks of said manual controller;

calculating respective levels of similarity individually for each of said user-input arrows; and calculating an average of said levels of similarity for producing said evaluation of the control input.

13. The computer-readable medium according to claim 9, wherein said reference pattern image comprises a changing waveform that changes over time, said program further comprising the steps of:

inputting said input pattern image comprising a user-input waveform input using at least one joystick of said manual controller while observing said changing waveform;

recalculating said level of similarity at respective intervals; and displaying the calculated level of similarity as said level of similarity changes over time.

14. A program readable and executable by a computer, for use in an entertainment system having an entertainment apparatus for executing various programs, at least one manual controller for entering control requests from a user into said entertainment apparatus, and a display unit for displaying images outputted from said entertainment apparatus, said program comprising the steps of:

comparing an input pattern image displayed according to a control input entered from said manual controller and a reference pattern image with each other;

converting the control input from said manual controller into the input pattern image;

comparing said input pattern image and said reference pattern image with each other, and determining a level of similarity therebetween from among plural levels of similarity;

producing an evaluation of the control input based on the determined level of similarity; and changing the progress of a program executed by said entertainment apparatus based on the produced evaluation, wherein said progress of the program comprises the execution of a scenario, and said scenario is changed based on the produced evaluation.

15. The program according to claim 14, wherein said reference pattern image comprises a plurality of arrows oriented in different directions and having different lengths, respectively, said program further comprising the steps of:

inputting said input pattern image comprising a plurality of user-input arrows input by using respective joysticks of said manual controller;

calculating respective levels of similarity individually for each of said user-input arrows; and calculating an average of said levels of similarity for producing said evaluation of the control input.

16. The program according to claim 14, wherein said reference pattern image comprises a changing waveform that changes over time, said program further comprising the steps of:

inputting said input pattern image comprising a user-input waveform input using at least one joystick of said manual controller while observing said changing waveform;

recalculating said level of similarity at respective intervals; and displaying the calculated level of similarity as said level of similarity changes over time.

* * * * *